Figure 1:
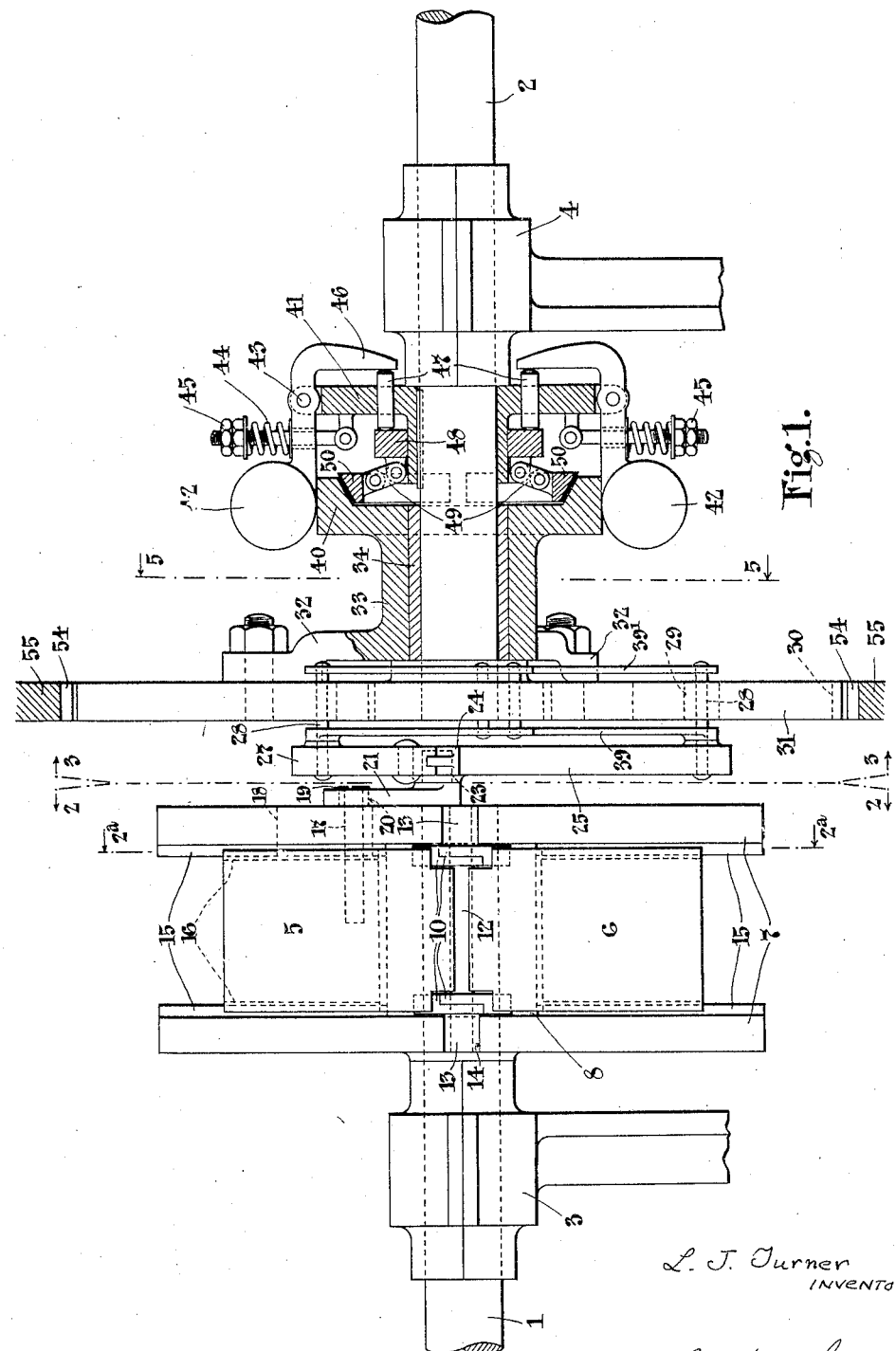

June 18, 1929.  L. J. TURNER  1,718,092
VARIABLE SPEED POWER TRANSMITTING MECHANISM
Filed Sept. 6, 1927  3 Sheets-Sheet 1

L. J. Turner
INVENTOR

By: Marks & Clerk
Attys.

June 18, 1929. L. J. TURNER 1,718,092
VARIABLE SPEED POWER TRANSMITTING MECHANISM
Filed Sept. 6, 1927 3 Sheets-Sheet 2
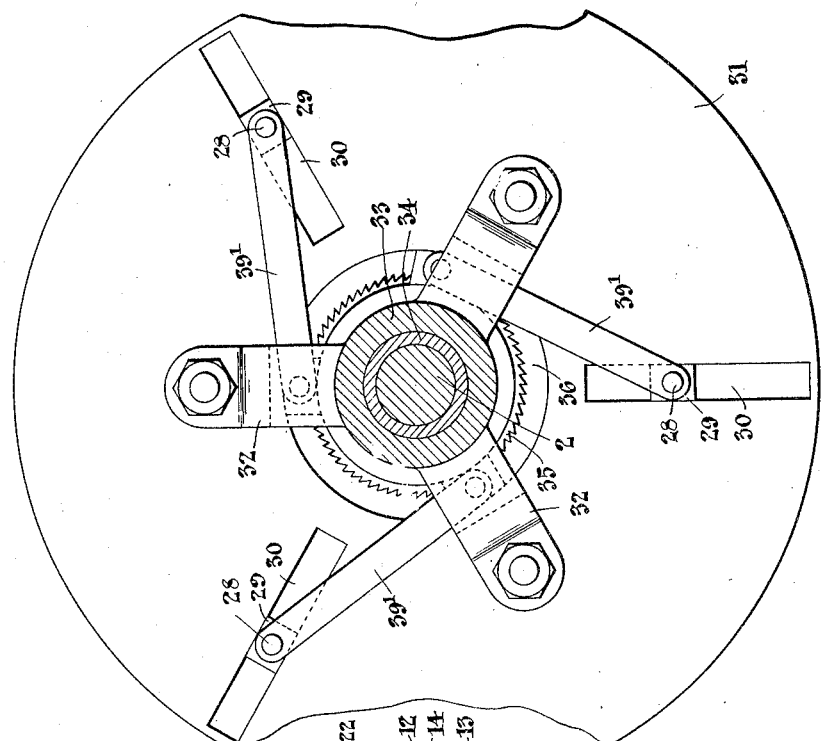
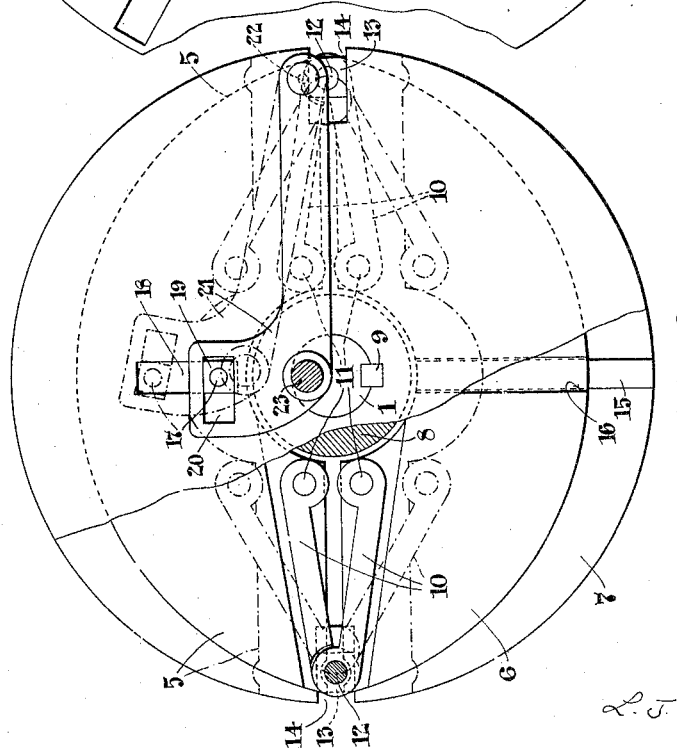
L. J. Turner
INVENTOR
By: Marks & Clark
Attys.

June 18, 1929.  L. J. TURNER  1,718,092
VARIABLE SPEED POWER TRANSMITTING MECHANISM
Filed Sept. 6, 1927   3 Sheets-Sheet 3
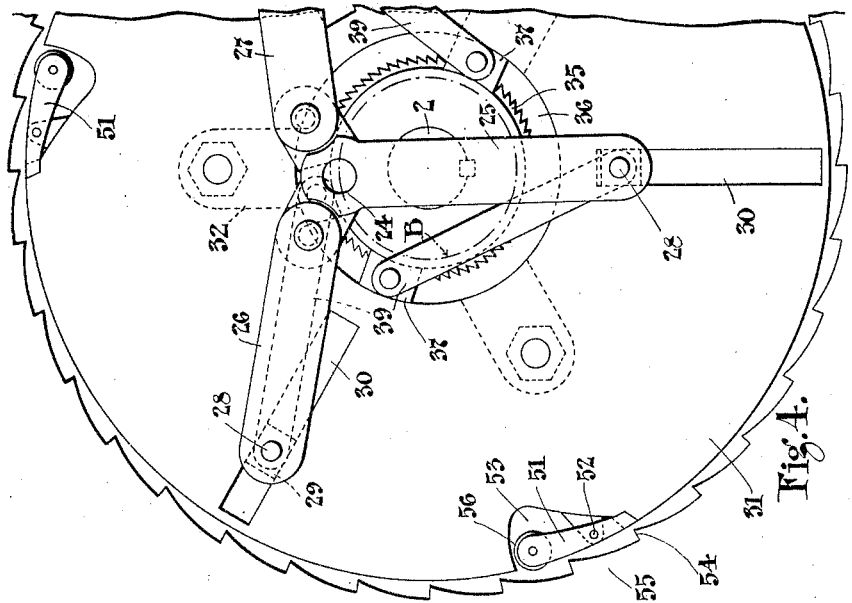
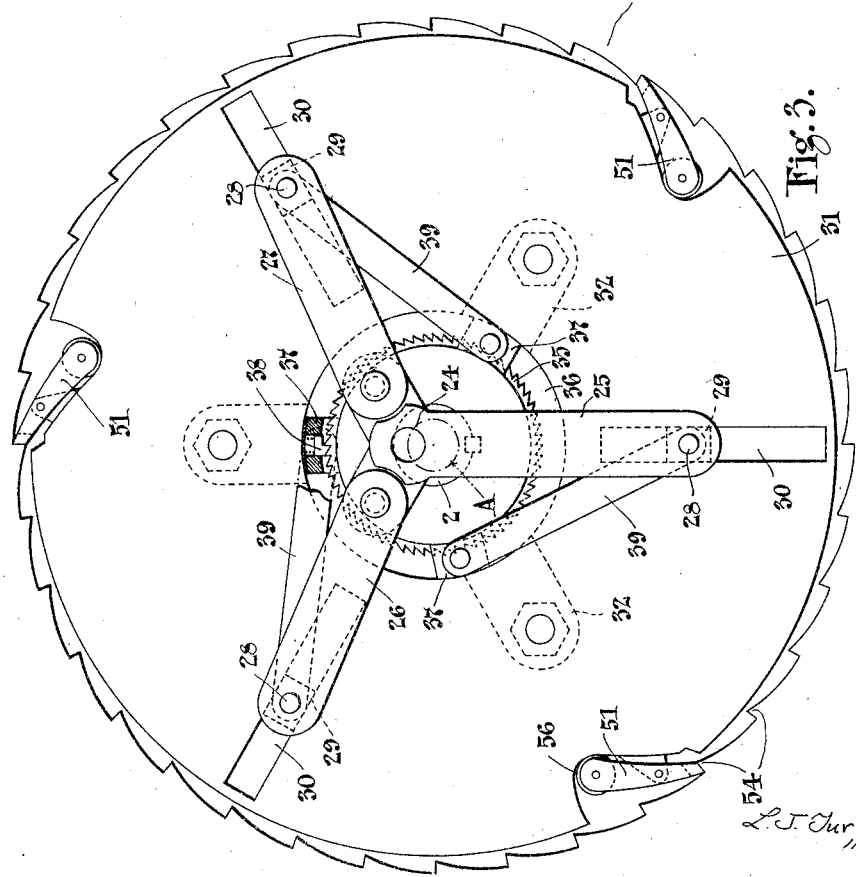
L. J. Turner
INVENTOR
By Marks & Clerk
Attys.

Patented June 18, 1929.

1,718,092

UNITED STATES PATENT OFFICE.

LOUIS JOSEPH TURNER, OF OTTAWA, ONTARIO, CANADA.

VARIABLE-SPEED POWER-TRANSMITTING MECHANISM.

Application filed September 6, 1927. Serial No. 217,813.

This invention relates to variable speed power transmitting mechanism of the type adapted to transmit power from a driving shaft to a driven shaft and so arranged that variations of load on the driven shaft or of the power of the driving shaft causes automatic adjustment of the mechanism whereby the driven shaft automatically assumes a speed which permits the engine to maintain the desired speed and develop the desired power.

The object of the invention is to provide an improved mechanism of this general type, of relatively simple construction and efficient and reliable in operation.

This invention consists in a variable speed power transmitting mechanism comprising a driving shaft, a driven shaft, means actuated by the driving shaft for imparting successive rotational impulses to the driven shaft, and means for automatically varying the magnitude of said impulses according to speed of rotation of said driving shaft.

The invention further consists in the construction, combination and arrangement of parts described hereinafter and more particularly specified in the appended claims.

Referring now to the accompanying drawings which illustrate diagrammatically and by way of example one convenient embodiment of the invention, Figure 1 is a side elevation partially in section.

Figure 2 is, at the right hand side, a section on line 2—2 of Figure 1, and at the left hand side, is a section substantially on the line 2ᵃ—2ᵃ of Figure 1, Figure 3 is a section on the line 3—3 of Figure 1 with the mechanism transmitting power at low speed, Figure 4 is a sectional view similar to Figure 3, but showing the parts transmitting power at high speed, and Figure 5 is a section on line 5—5 of Figure 1.

A driving shaft is shown at 1 and a driven shaft at 2, bearings 3 and 4 being indicated for the support of these shafts in axial alignment with each other. A pair of balanced weights 5 and 6 are arranged to revolve with the driving shaft 1. These weights are shown as being mounted in a supporting member consisting of a pair of discs 7 integrally connected by a sleeve 8 keyed to the shaft 1 as at 9. The weights 5 and 6 are mounted in any suitable manner so as to be capable of moving outwardly under the action of centrifugal force when the shaft 1 is rotated. The means shown for this purpose in the drawings consist of two pairs of links 10—10 each pair being pivoted at one end at 11 to the weights 5 and 6 and hinged together at the other end on a pin 12 mounted in blocks 13 slidably mounted in radial slots 14 in the discs 7. Means such as coacting ribs and grooves 15 and 16 on the weights 5 and 6 and the discs 7 are provided to guide the weights in their radial movements.

Weight 5 is provided with a pin 17 which projects through a slot 18 in the inner disc 7. The outer end of the pin 17 carries a block 19 slidable in a slot 20 formed in a lever 21 pivoted at 22 to the disc 7 and carrying a crank pin 23. (See Figures 1 and 2.)

The crank pin 23 fits into a bearing 24 formed in an arm 25 to which are pivotally connected a pair of arms 26 and 27 of similar length. The outer ends of the arms 25, 26 and 27 carry pins 28 supported in bearing blocks 29 slidable in radial slots 30 in a disc 31. The disc 31 is shown as being supported by a plurality of lugs 32 carried by a sleeve 33 rotatably mounted on a bushing 34 on the driven shaft 2. To the end of the driven shaft 2 is secured a rotary impulse receiving element such as a ratchet wheel 35 arranged in a central circular aperture in the disc 31 so as to form an annular space 36. Guide members or blocks 37 reciprocate in the space 36 and carry suitable impulse imparting elements such as dogs or pawls 38 (Figure 3). The members 37 are pivotally connected by links 39 to the pins 28 at the outer ends of the arms 25, 26 and 27 respectively. Links 39′ may be provided to connect the members 37 with their respective pins 28 on the other side of the disc 31. (Figures 1 and 5.)

A centrifugally operated clutch is provided on the driven shaft 2 to couple the driven shaft to the disc 31, when the shaft 2 has attained a certain predetermined high speed. The clutch illustrated comprises an internal cone member 40 carried by the sleeve 33 and therefore rigidly connected to the disc 31 though normally rotatable with respect to the shaft 2. A frame 41 is keyed to the load shaft 2 and carries a plurality of balance weights 42 pivoted at 43. The weights are normally pressed inwardly by means of springs 44, the compression of which is adjustable by means of nuts 45. When the weights move outwardly, upon being rotated at high speed, arms 46 press upon slidable rods 47 which bear upon a slidable annular member 48 pivotally connected by links 49 to a plurality of sections of a cone member 50 coacting with the cone member 40.

Normally the weights 5 and 6 are drawn to their inward position by means of any suitable springs, not shown, this position being indicated in Figure 1 and in full line in Figure 2. In this position the crank pin 23 is also in its innermost position and is only slightly eccentric with respect to the axis of the shaft 1. (See Figure 2). When the driving shaft 1 is rotated the crank pin 23 initially revolves the bearing 24 on the circle A, and the arms 25, 26 and 27 cause the blocks 29 to reciprocate in the slots 30 and through the links 39—39', the dogs 38 act in turn to impart rotary impulses to the ratchet wheel 35 and therefore to the shaft 2. As the inertia of the load on the shaft 2 is gradually overcome, the weights 5 and 6 are able to move further out from the shaft 1 and thereby pull the crank pin 23 to a more eccentric position with respect to the axis of shaft 1. As the eccentricity of the crank pin 23 increases the eccentricity of the bearing 24 is similarly increased. It will be seen that the length of stroke of the links 39 is dependent upon the degree of eccentricity of the bearing 24, so that as the inertia of the load is progressively overcome and the weights 5 and 6 and crank pin 23 move gradually outward, the magnitude of the rotary impulses of the dogs 38 gradually increases and the speed of the load shaft 2 gradually approaches that of the driving shaft 1. Figure 4 illustrates the position of the parts when the bearing 24 is in the outermost position in which the crank pin 23 and bearing 24 revolve about the circle B. When the shaft 2 acquires a predetermined high speed in relation to the speed of the shaft 1, the weights 42 will act, as already described, to clutch the disc 31 to the shaft 2 and thereafter, if the load is not increased, the shaft 1 and 2 and the intermediate parts of the gear will rotate together. The speed at which the clutch operates may be determined by adjustment of the springs 44.

Under certain load conditions the disc 31 might have a tendency to rotate in a reverse direction, and to prevent this suitable means are provided such as pawls 51 pivoted at 52 in recesses 53 in the disc 31. These pawls coact with internal ratchet teeth 54 formed in a stationary member 55. If the disc 31 slows down beyond a certain speed, weights 56 cause the outer ends of the pawls to move outwardly into position to engage the ratchet teeth 55 so as to prevent backward rotation of the disc 31. So long as the disc 31 rotates in the proper direction at above a predetermined speed, the weights 56 fly outwardly and maintain the pawls out of contact with the teeth 55.

The present invention therefore provides a power transmission device which automatically adjusts itself to provide infinite variability of load shaft speed between the minimum and maximum speed of the driving shaft.

It will be understood that the mechanism shown for carrying the invention into effect is illustrated in a diagrammatic manner and by way of example only. Many changes of construction are possible without departing from the invention as defined in the appended claims.

What I claim is:—

1. A variable speed power transmitting mechanism comprising a driving shaft, a driven shaft, a member normally rotatable with respect to said driven shaft, a variable stroke driving means carried partly by the driven shaft and partly by said member, centrifugally operated means on the driving shaft to vary the stroke of said driving means, and means for clutching said member to said driven shaft when the latter rotates above a predetermined speed.

2. A variable speed power transmitting mechanism, comprising a plurality of revolvable weights, a crank pin eccentrically arranged with respect to the axis of revolution of said weights, means for communicating radial movement of said weights to said crank pin to vary the eccentricity thereof, a bearing engaged by said crank pin, an arm connected rigidly to said bearing, a plurality of arms pivoted to said bearing, a rotatable member having radially arranged means for guiding the outer ends of said arms, a rotary impulse receiving element coaxial with said rotatable member links connected to the outer ends of said arms, and reciprocating impulse imparting elements on the free ends of said links and engaging said impulse receiving element.

3. A variable speed power transmitting mechanism as claimed in claim 2, wherein said impulse receiving element is connected to a driven load shaft and means are provided for clutching the rotatable member to said shaft when the latter rotates above a predetermined speed.

4. A variable speed power transmitting mechaism comprising a driving shaft, a supporting member on said shaft, weights carried by said supporting member, a crank pin pivotally connected to said member, means connecting said crank pin with said weights whereby radial movement of the latter varies the eccentricity of the crank pin in relation to the axis of said driving shaft, a driven load shaft in axial alignment with said driving shaft, a ratchet wheel carried by the end of said load shaft, a centrally apertured disc concentric with and in the same plane as said ratchet wheel, reciprocating pawls coacting with said ratchet wheel, a revolvable bearing engaged by said crank pin, and link mechanism connecting said pawls with said bearing so that revolution of the bearing reciprocates said pawls successively.

5. A power transmitting mechanism as claimed in claim 4 wherein means are provided for automatically clutching said disc to the load shaft when the latter rotates above a predetermined speed.

6. A power transmitting mechanism as claimed in claim 4, wherein means are provided for preventing backward rotation of said disc.

7. A power transmitting mechanism as claimed in claim 4, wherein pawls are pivotally mounted on said disc, a stationary ratchet being arranged for engagement by one end of said pawls when the disc is rotating slowly, and weights being provided on the other ends of said pawls acting centrifugally to withdraw the pawls from engagement with the ratchet when the disc rotates above a certain speed.

8. A variable speed power transmitting mechanism comprising a driving shaft, a driven shaft, means actuated by the driving shaft for imparting successive rotational impulses to the driven shaft, means for automatically varying the magnitude of said impulses according to speed of rotation of said driving shaft, and means for automatically clutching said driven shaft to said driving shaft when a predetermined speed of rotation has been reached.

9. A variable speed power transmitting mechanism comprising a driving shaft, a driven shaft, means actuated by the driving shaft for imparting successive rotational impulses to the driven shaft, means for automatically varying the magnitude of said impulses according to the speed of rotation of said driving shaft, a rotary member for supporting and guiding said impulse imparting means, a stationary ratchet surrounding said member, pawls carried by said member and arranged to engage said ratchet and weights acting centrifugally to cause withdrawal of said pawls to inoperative position when the rotary member rotates above a certain speed.

10. A variable speed power transmitting mechanism comprising a driving shaft, a driven shaft, means actuated by the driving shaft for imparting successive rotational impulses to the driven shaft, means for automatically varying the magnitude of said impulses according to the speed of rotation of said driving shaft, a rotary member for supporting and guiding said impulse imparting means and means for automatically clutching said rotary member to said driven shaft when the latter attains a predetermined speed.

In testimony whereof I affix my signature.

LOUIS JOSEPH TURNER.